(12) United States Patent  
Biswas et al.

(10) Patent No.: US 9,868,663 B2
(45) Date of Patent: Jan. 16, 2018

(54) GLASS CERAMICS HAVING LOW RHODIUM LEVELS

(71) Applicant: CORNING INCORPORATED, Corning, NY (US)

(72) Inventors: Samir Biswas, Horseheads, NY (US); Qiang Fu, Painted Post, NY (US); David Myron Lineman, Painted Post, NY (US); Ronald Leroy Stewart, Elmira, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 15/200,571

(22) Filed: Jul. 1, 2016

(65) Prior Publication Data

US 2016/0311718 A1    Oct. 27, 2016

Related U.S. Application Data

(62) Division of application No. 14/286,307, filed on May 23, 2014, now Pat. No. 9,403,715.

(Continued)

(51) Int. Cl.
*C03B 5/16* (2006.01)
*C03C 10/12* (2006.01)
(Continued)

(52) U.S. Cl.
CPC .............. *C03C 1/02* (2013.01); *C03B 5/16* (2013.01); *C03C 3/093* (2013.01);
(Continued)

(58) Field of Classification Search
None
See application file for complete search history.

(56) References Cited

U.S. PATENT DOCUMENTS 3,531,303 A    9/1970 Bahat
3,871,853 A    3/1975 Dietz et al.
(Continued)

FOREIGN PATENT DOCUMENTS

EP    1698596    9/2006
GB    863569    3/1961
(Continued)

OTHER PUBLICATIONS

Hampton "Colour of Heavy Lead Silicate Glass"; Nature, 158:582 1946.
(Continued)

*Primary Examiner* — David Sample
(74) *Attorney, Agent, or Firm* — Kevin M. Johnson

(57) ABSTRACT

A glass ceramic precursor glass and a glass ceramic having low levels of rhodium and a method of controlling the amount of rhodium in such glasses and glass ceramics. The precursor glass and glass ceramic contain from about 1 ppm to about 10 ppm and, in certain embodiments, from about 1 ppm to about 6 ppm rhodium. The method of controlling of reducing rhodium dissolution from a rhodium-containing material such as, for example, an alloy into a glass melt comprises controlling and/or lowering the partial pressure of oxygen at the rhodium-containing vessel/glass interface by imposing a high humidity condition around the external (non-glass-contact) surface of the rhodium-containing material. The lower concentration of rhodium minimizes its coloring effect on the white color of the glass ceramic.

17 Claims, 6 Drawing Sheets

Related U.S. Application Data

(60) Provisional application No. 61/828,895, filed on May 30, 2013.

(51) Int. Cl.
    *C03C 10/00*     (2006.01)
    *C03C 21/00*     (2006.01)
    *C03C 3/093*     (2006.01)
    *C03C 1/02*     (2006.01)

(52) U.S. Cl.
    CPC ........ *C03C 10/0027* (2013.01); *C03C 21/002* (2013.01); *C03C 2204/04* (2013.01); *Y10T 428/315* (2015.01)

(56) References Cited

U.S. PATENT DOCUMENTS

| | | | |
|---|---|---|---|
| 4,778,549 A | 10/1988 | Cowan, Jr. et al. | |
| 4,919,699 A | 4/1990 | Matsukawa et al. | |
| 5,785,726 A | 7/1998 | Dorfeld et al. | |
| 6,413,906 B1* | 7/2002 | Shimatani | C03C 10/0027 501/4 |
| 7,628,038 B2 | 12/2009 | DeAngelis et al. | |
| 7,976,768 B2 | 7/2011 | Brady et al. | |
| 8,127,572 B2* | 3/2012 | Dorfeld | C03B 5/163 65/134.1 |
| 8,664,130 B2 | 3/2014 | Beall et al. | |
| 8,753,991 B2 | 6/2014 | Comte et al. | |
| 2004/0067369 A1* | 4/2004 | Ott | C03B 5/1672 428/432 |
| 2006/0166804 A1* | 7/2006 | Sprenger | C03C 3/062 501/10 |
| 2006/0242995 A1 | 11/2006 | Bookbinder et al. | |
| 2007/0213192 A1 | 9/2007 | Monique Comte et al. | |
| 2009/0217708 A1 | 9/2009 | DeAngelis et al. | |
| 2009/0286667 A1 | 11/2009 | Siebers et al. | |
| 2010/0083704 A1* | 4/2010 | Grzesik | C03B 17/064 65/51 |
| 2010/0192633 A1 | 8/2010 | DeAngelis et al. | |
| 2011/0034316 A1 | 2/2011 | Leister et al. | |
| 2011/0092353 A1 | 4/2011 | Amin et al. | |

FOREIGN PATENT DOCUMENTS

| | | |
|---|---|---|
| GB | 863570 | 3/1961 |
| GB | 1217049 | 12/1970 |
| JP | 2006225215 | 8/2006 |

OTHER PUBLICATIONS

PCT/US2014/039340 IPRP dated Dec. 10, 2015.
PCT/US2014/039340 Search Report dated Sep. 16, 2014.
Rindone et al; "The Colors of Platinum, Palladium and Rhodium in Simple Glasses"; J. Am. Ceram. Soc., 1956, 39:173-180.
English Translation of CN201480031312.7 First Office Action dated Apr. 1, 2017, China Patent Office.

* cited by examiner

GLASS CERAMICS HAVING LOW RHODIUM LEVELS

This application is a divisional of U.S. patent application Ser. No. 14/286,307 filed on May 23, 2014, the content of which is relied upon and incorporated herein by reference in its entirety, and the benefit of priority under 35 U.S.C. §120 is hereby claimed and also claims the benefit of priority under 35 U.S.C. §119 of U.S. Provisional Application Ser. No. 61/828,895, filed on May 30, 2013, the content of which is relied upon and incorporated herein by reference in its entirety.

BACKGROUND

Precious metals (typically platinum alloys containing 0-20 wt % rhodium) are widely used in glass melting tanks due to their combination of high-temperature properties such as strength, ductility, weldability, resistance to oxidation, and relative inertness when exposed to glass-forming melts. Formation of precious metal sourced inclusions and the coloring effect of rhodium are of concern. Rhodium inclusions in glasses can be mitigated and potentially eliminated by controlling the partial pressure of hydrogen on the non-glass-contact surface of precious metals and by batching multivalent oxides in the glass composition, as reported. However, minimization of rhodium dissolution from precious metal alloys used in the glass melting process and the coloring effect of rhodium on glass or glass-ceramics has not been investigated.

SUMMARY

The present disclosure provides a glass ceramic precursor glass and a glass ceramic having low levels of rhodium and a method of controlling the amount of rhodium in such glasses and glass ceramics. The precursor glass and glass ceramic contain from about 1 ppm to about 10 ppm and, in certain embodiments, from about 1 ppm to about 6 ppm rhodium. The method of controlling of reducing rhodium dissolution from a rhodium-containing material such as, for example, an alloy into a glass melt comprises controlling and/or lowering the partial pressure of oxygen at the rhodium-containing vessel/glass interface. This is achieved by imposing a high humidity condition around the external (non-glass-contact) surface of the rhodium-containing material. In one embodiment, a mixture of water vapor, oxygen, and nitrogen generates a desired humidity and reducing atmosphere. The lower concentration of rhodium minimizes its coloring effect on the white color of the glass ceramic.

Accordingly, one aspect of the disclosure is to provide a lithia-alumina-silica glass ceramic comprising from about 1 ppm to about 10 ppm rhodium. The glass ceramic has an opacity of at least 85% over a wavelength range of 400 to 700 nm and CIELAB color space coordinates L*, a*, and b*, wherein L* is at least 92, and b* is at least −0.3.

A second aspect of the disclosure a method of controlling or reducing dissolution in a glass ceramic precursor glass and a glass ceramic. The method comprises providing a melt of the precursor glass, wherein the melt is in contact with a rhodium-containing material; and exposing an external surface of the rhodium-containing material to an atmosphere containing water vapor, wherein the water vapor suppresses dissolution of rhodium in the melt.

These and other aspects, advantages, and salient features will become apparent from the following detailed description, the accompanying drawings, and the appended claims.

DETAILED DESCRIPTION

Figure 1A:
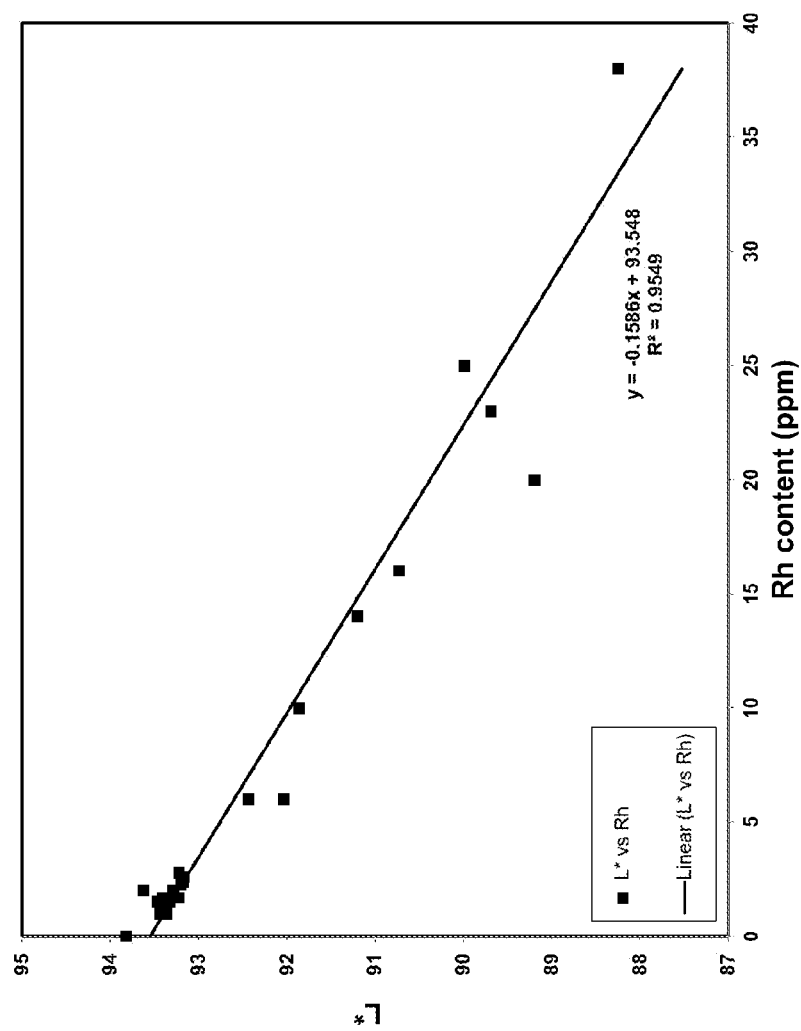
FIG. 1a is a plot of sensitivity of glass ceramic color, expressed in terms of CIELAB L* color coordinate, to the rhodium concentration in glass ceramic precursor glass.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

As used herein, the terms "glass" and "glasses" includes both glasses and glass ceramics. The terms "glass article" and "glass articles" are used in their broadest sense to include any object made wholly or partly of glass and/or glass ceramic.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

Glass-ceramics in the $SiO_2$—$Al_2O_3$—$Li_2O$ system are characterized by low thermal expansion over a wide temperature range and silica concentrations. These glass-ceramics have a β-quartz solid solution or a β-spodumene solid solution as a main crystalline phase. The β-spodumene phase is known to be mechanically strong with near zero thermal expansion. High mechanical strength and low thermal expansion combined with other properties such as low dielectric loss make these glass-ceramics suitable for consumer electronics and other technical applications. The glass-ceramics are typically white in color or transparent. Consumer electronics applications typically require materials with color variation within a short range.

Glass-ceramics are formed by controlled nucleation and crystallization of glass having a desired composition. Nucleation involves heating the glass to a nucleation temperature and allowing the glass to soak at the nucleation temperature, during which crystal nuclei develop in the glass. Crystallization involves further heating the glass to a crystallization temperature and allowing the glass to soak at the crystallization temperature, during which crystals grow and precipitate in the glass. The resulting glass-ceramic is then cooled to room temperature. The properties of the glass-ceramic will depend on the glass composition, the nucleation and crystallization parameters, and the glass-ceramic microstructure.

Glass ceramics may be used as components of mobile electronic devices due to a combination of attributes such as white color, opacity, transparency to radio waves, and suitability for chemical strengthening via ion exchange. Such products may be produced on a platform that uses a platinum delivery system. In order to reduce the melting and overall manufacturing cost of such products, However, melting units that comprising direct-heated platinum/rhodium alloy hardware with capability for producing high quality glass (i.e., with a low number of inclusions) at high glass flow rates may be used. Rhodium from the alloy may dissolve in the precursor glass producing a yellowish cast and discoloring the white glass ceramic.

Described herein is a glass precursor for a glass ceramic which, having been processed in a rhodium-containing melter comprises low levels of rhodium. Specifically, the glass precursor and resulting glass ceramic contain or comprise from about 1 ppm to about 10 ppm rhodium and, in certain embodiments, from about 1 ppm to about 6 ppm rhodium. The glass ceramic has an opacity of at least 85% over a wavelength range of 400 to 700 nm and has CIELAB color space coordinates L*, a*, and b*. Color coordinate a* denotes the variation in color between green (a−) and red (a+). Color coordinate b* denotes the variation between blue (b−) and yellow (b+). Color dimension L* represents the variation in color from black (L−) to white (L+).

For the glasses described herein, color coordinate L* is at least 92, and b* is at least −0.3. In some embodiments, L* is in a range from about 92.3 to about 94 and, in other embodiments, from about 93 to about 94. Color coordinate b*, in some embodiments, is in a range from about 0.25 to about −0.50, and a* is in a range from about −0.10 to about −0.50. The glasses described herein may have a total reflectance oaf at least about 80% over the wavelength range of 400 to 700 nm. In some embodiments, the glass ceramic is white; i.e., no primary or secondary color in the visible spectrum is discernible in light reflected from the glass ceramic. In other embodiments, the glass ceramic is black; i.e., no color in the visible spectrum is reflected by the glass ceramic.

In some embodiments, the glass ceramic and the precursor glass contain lithia ($Li_2O$), silica ($SiO_2$) and alumina ($Al_2O_3$). Examples of such glass ceramics are described in U.S. patent application Ser. No. 13/837,863, filed on Mar. 15, 2013, by George Halsey Beall et al., entitled "White, Opaque β-Spodumene/Rutile Glass-Ceramics; Articles Comprising the Same; and Methods for Making the Same," and claiming priority to U.S. Patent Provisional Application No. 61/623,905 filed on Apr. 13, 2012, and having the same title. The contents of both applications are incorporated herein by reference in their entirety. In some embodiments, the glass ceramic comprises: from about 62 to about 75 mol % $SiO_2$; from about 10.5 to about 17 mol % $Al_2O_3$; from about 5 to about 13 mol % $Li_2O$; from 0 to about 4 mol % ZnO; from about 0 to about 8 mol % MgO; from about 2 to about 5 mol % $TiO_2$; from 0 to about 4 mol % $B_2O_3$; from 0 to about 5 mol % $Na_2O$; from 0 to about 4 mol % $K_2O$; from 0 to about 2 mol % $ZrO_2$; from 0 to about 7 mol % $P_2O_5$; from 0 to about 0.3 mol % $Fe_2O_3$; from 0 to about 2 mol % $MnO_x$, and from about 0.05 to about 0.2 mol % $SnO_2$, at least one β-spodumene solid solution comprising at least about 70 wt % of the crystalline phases of the glass-ceramic, and at least one titanium-containing crystalline phase having an acicular morphology and a rutile phase.

In some embodiments, the glass ceramic is transparent to radio waves—i.e., electromagnetic radiation having a frequency in a range from about 3 kHz to about 300 GHz. The glass ceramic may be strengthened by ion exchange. The ion exchanged glass ceramic has a layer extending from a surface of the glass ceramic to a depth of layer, wherein the layer has a compressive stress of at least 300 MPa and, in some embodiments, at least 500 MPa, and wherein the depth of layer in some embodiments is at least about 30 microns.

The glass ceramic described herein is obtained by controlling and/or reducing the dissolution of rhodium from the precious metal alloy into the glass-forming melt by controlling and/or lowering the partial pressure of oxygen at the interface between the alloy vessel and the glass. This may be achieved by imposing a high humidity condition around the external surface (i.e., the portion of the alloy that is not in contact with the glass) of the rhodium-containing alloy. Alternatively, rhodium dissolution in the glass may be decreased by increasing the level of multivalent species such as tin, antimony, iron oxide, or the like in the glass.

The high humidity environment around the exterior surface of the precious metal alloy vessel may be created by providing a mixture of water vapor, oxygen, and nitrogen to generate a desired humidity and reducing atmosphere. For example, rhodium dissolution is reduced by a factor of two when the dew point (i.e., the temperature to which air must be cooled, at a given pressure and water-vapor content, for it to reach saturation) of the atmosphere around the exterior surface of the vessel is changed from −40° C. to 90° C. The resulting lower concentration of rhodium minimizes the yellowing effect on the white color of the glass ceramic.

The method of reducing rhodium dissolution from platinum/rhodium alloys into the precursor glass and glass ceramic was confirmed by trials in a melter. The trials are summarized in Table 1. The non-glass-contact 80Pt/20Rh alloy surface in the delivery system of the melter was exposed to a humidified atmosphere containing water vapor and a gas mixture (1.5% $O_2$ and 98.5% $N_2$). Samples are grouped according to the conditions under which they were processed: heating at 1600° C. under an atmosphere in which the dew point was −40° C. (A in FIGS. 2a-c); heating at 1650° C. under an atmosphere in which the dew point was −40° C. (B in FIGS. 2a-c); and heating at 1650° C. under an atmosphere in which the dew point was 90° C. (C in FIGS. 2a-c). The composition of the precursor glass and glass ceramic samples is: 65.2 wt % $SiO_2$, 20.1 wt % $Al_2O_3$, 0 wt % $Fe_2O_3$, 2 wt % $B_2O_3$, 3.6 wt % $Li_2O$, 0.4 wt % $Na_2O$, 1.8 wt % MgO, 2.2 wt % ZnO, 4.4 wt % $TiO_2$, and 0.3 wt % $SnO_2$. The glass ceramic was formed by ceramming samples by first heating the samples at 780° C. for two hours, followed by heating at 975° C. for four hours. A reduction of rhodium dissolution by a factor of two (from 2.4 ppm to 1.2 ppm) was observed when the effective dew point was increased from −40 to 90° C.

Figure 2A:
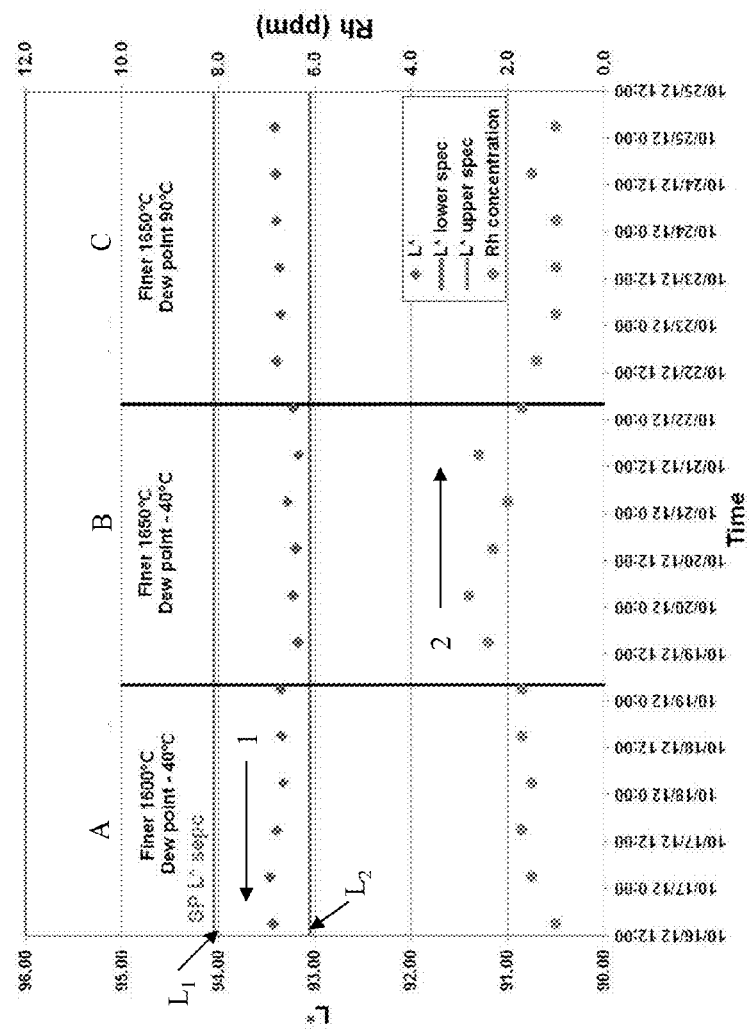
FIG. 2a is a plot of CIELAB L* color coordinates and rhodium levels for glass ceramics formed from the samples listed in Table 1.
Figure 2B:
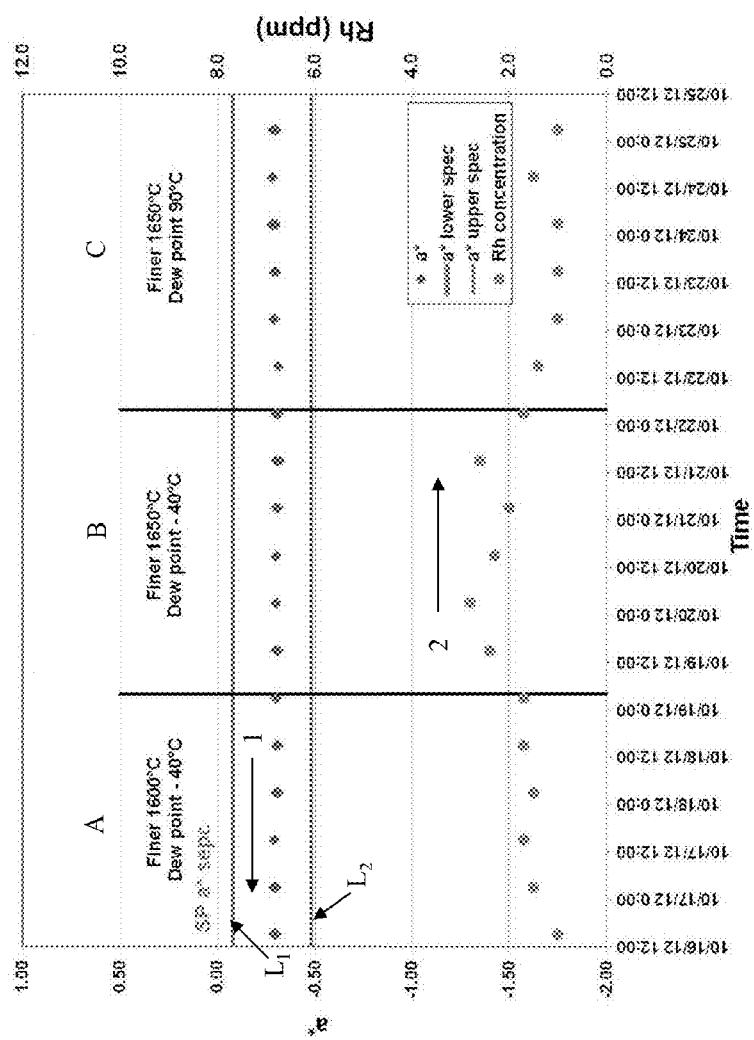
FIG. 2b is a plot of CIELAB a* color coordinates and rhodium levels for glass ceramics formed from the samples listed in Table 1.
Figure 2C:
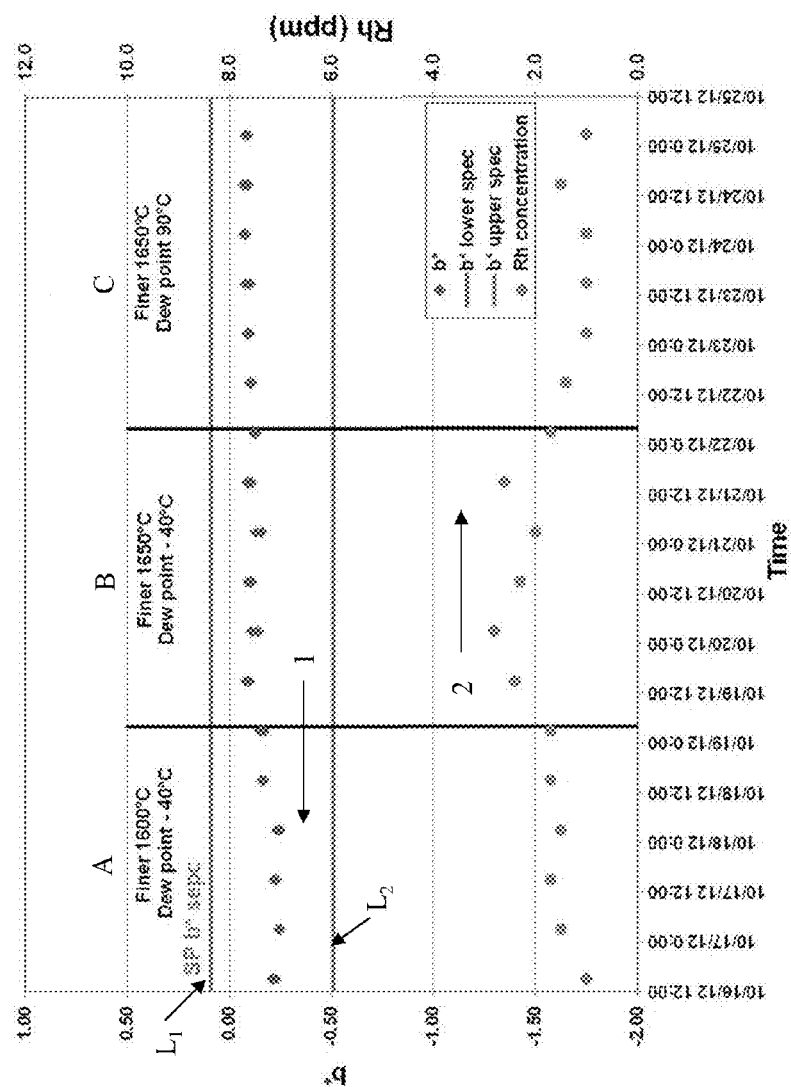
FIG. 2c is a plot of CIELAB b*color coordinates and rhodium levels for glass ceramics formed from the samples listed in Table 1.

Values for CIELAB L*, a*, and b* coordinates and rhodium levels for glass ceramics formed from the samples listed in Table 1 are plotted in FIGS. 2a-c, respectively. Samples are grouped according to the conditions under which they were processed: heating at 1600° C. under an atmosphere in which the dew point was −40° C. (A in FIGS. 2a-c); heating at 1650° C. under an atmosphere in which the dew point was −40° C. (B in FIGS. 2a-c); and heating at 1650° C. under an atmosphere in which the dew point was 90° C. (A in FIGS. 2a-c). Upper and lower limits L1, L2 are also provided for the color coordinates 1 in FIGS. 2a-c.

TABLE 1

| Condition A (Finer 1600° C., dew point −40° C.) | | Condition B (Finer 1650° C., dew point −40° C.) | | Condition C (Finer 1650° C., dew point 90° C.) | |
| --- | --- | --- | --- | --- | --- |
| Sample | Rh (ppm) | Sample | Rh (ppm) | Sample | Rh (ppm) |
| Oct. 16, 2012 0300 | 1.7 | Oct. 19, 2012 0900 | 2.4 | Oct. 22, 2012 0900 | 1.7 |
| Oct. 16, 2012 0900 | 1.4 | Oct. 19, 2012 1500 | 2.4 | Oct. 22, 2012 1500 | 1.4 |
| Oct. 16, 2012 1500 | 1.0 | Oct. 20, 2012 0300 | 2.8 | Oct. 23, 2012 0300 | 1.0 |
| Oct. 17, 2012 0300 | 1.5 | Oct. 20, 2012 0900 | 2.6 | Oct. 23, 2012 0900 | 1.0 |
| Oct. 17, 2012 0900 | 1.6 | Oct. 20, 2012 1500 | 2.3 | Oct. 23, 2012 1500 | 1.0 |
| Oct. 17, 2012 1500 | 1.7 | Oct. 21, 2012 0300 | 2.0 | Oct. 24, 2012 0300 | 1.0 |
| Oct. 18, 2012 0300 | 1.5 | Oct. 21, 2012 0900 | 2.4 | Oct. 24, 2012 0900 | 1.5 |
| Oct. 18, 2012 0900 | 1.6 | Oct. 21, 2012 1500 | 2.6 | Oct. 24, 2012 1500 | 1.5 |
| Oct. 18, 2012 1500 | 1.7 | Oct. 22, 2012 0300 | 1.7 | Oct. 25, 2012 0300 | 1.0 |
| Oct. 19, 2012 0300 | 1.7 | | | Oct. 25, 2012 0900 | 1.0 |
| Average | 1.5 | Average | 2.4 | Average | 1.2 |
| Standard deviation | 0.2 | Standard deviation | 0.3 | Standard deviation | 0.3 |

Figure 3:
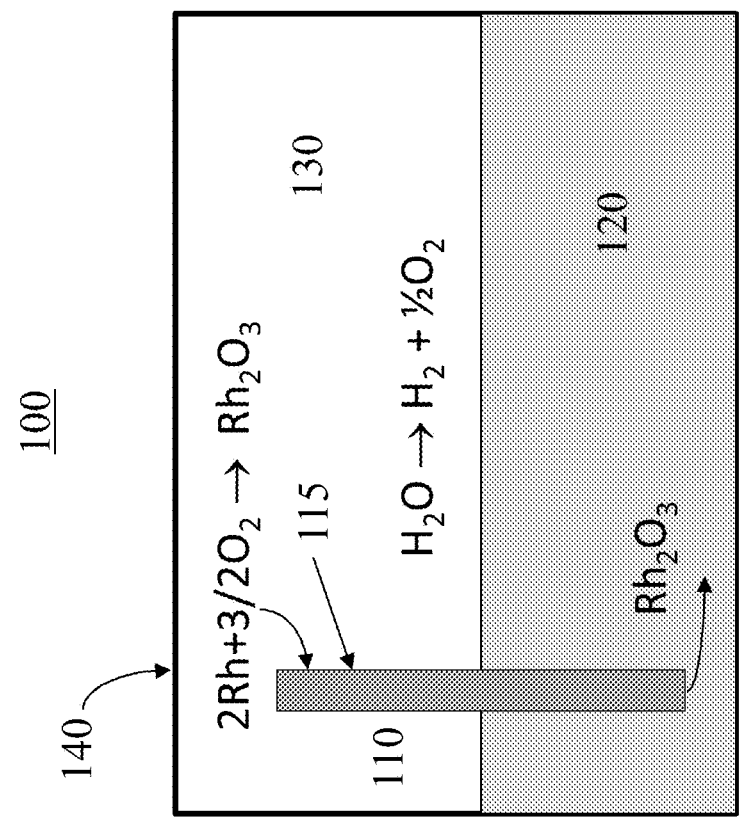
FIG. 3 is a schematic representation of the mechanism for rhodium dissolution in a glass melt.

The mechanism for rhodium dissolution in a glass melt is schematically shown in FIG. 3. The rhodium dissolution from the precious metal alloy 110 is caused by the oxidation reaction of metal with oxygen from the gas volume 130 within the continuous unit melter 100 at high temperature, $2Rh+3/2O_2 \rightarrow Rh_2O_3$, at the external surface 115 of the alloy that is not in contact with the glass melt 120 (also referred to herein as the "non-glass contact"). The rhodium oxide diffuses through the alloy 110 and into the glass melt 120. The rate of the oxidation reaction is dependent on the oxygen partial pressure at the metal/glass interface. Hydrogen diffusion into or out of the glass melt 120 via the precious metal membrane can effectively minimize the oxidation of the metal into the glass. By imposing a high humidity condition in the volume 130 using a mixture of gases and water vapor around the non-glass-contact external surface 115 of the alloy 110, the partial pressure of hydrogen is increased after reaching the thermodynamic equilibrium of water, $H_2O \rightarrow H_2 + \frac{1}{2}O_2$, which in turn suppresses the dissolution of rhodium from the alloy into the glass melt. To facilitate maintenance and control of the high humidity condition, at least a portion the continuous unit melter may be encased in a capsule 140.

Figure 1B:
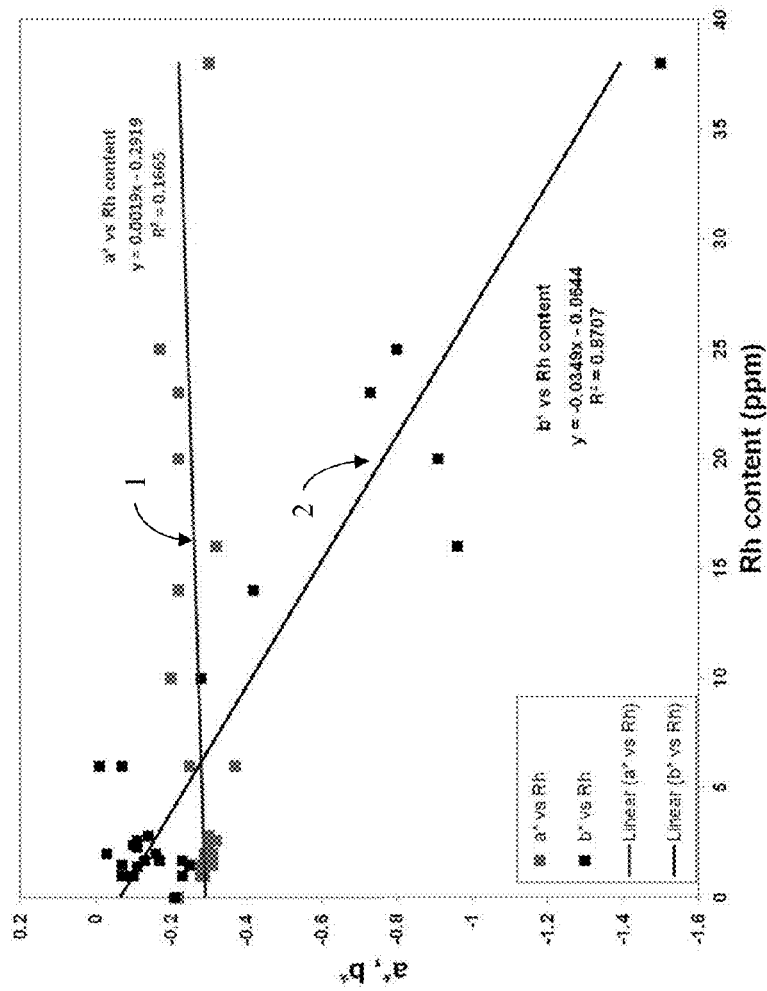
FIG. 1b is a plot of sensitivity of glass ceramic color, expressed in terms of CIELAB a* and b* color coordinates, to the rhodium concentration in glass ceramic precursor glass.

In order to meet tight color specifications, a minimal color impact from rhodium is desired. Control of rhodium dissolution in the glass is important for high-quality glasses, especially in product applications where color is critical. The sensitivity of glass ceramic color, expressed in terms of CIELAB L*, a*, and b* coordinates, to the rhodium concentration in glass ceramic precursor glass is shown in FIGS. 1a and 1b for the samples listed in Table 1. An increase of one part per million (ppm) of rhodium in the in the cerammed glass ceramic results in a 0.16 decrease of L* (FIG. 1a) and a 0.035 decrease in b* (line 2 in FIG. 1b), whereas a* increases by 0.0019 with a 1 ppm increase in rhodium (line 1 FIG. 1b).

Lower rhodium concentrations (2 in FIGS. 2a-c) achieved under a high humidity condition (C in FIGS. 2a-c; effective dew point of 90° C.) exhibit less coloring effect in the glass ceramics and provide a better match to the target color.

In addition to its dependence on the oxygen partial pressure at the metal/glass interface, the degree of rhodium dissolution depends upon the operating temperature of the platinum/rhodium alloy, glass composition, residence time of the glass-forming melt within the precious metal portion of the continuous unit melting system, and the surface-to-volume ratio of the glass-forming melt that is exposed to the Pt/Rh alloy.

In another aspect, a method of controlling and/or reducing dissolution of rhodium in in a glass ceramic precursor glass and/or a glass ceramic is provided. The method comprises providing a melt of the precursor glass, wherein the melt is in contact with a rhodium-containing material such as, for example, a platinum/rhodium alloy. As previously described herein, rhodium dissolution from the rhodium-containing material is caused by the oxidation reaction of the metal at the external surface of the metal or alloy with oxygen in the gas volume within the continuous unit melter at high temperature according to the reaction $2Rh+3/2O_2 \rightarrow Rh_2O_3$. In the methods described herein, the external surface of the rhodium-containing material is exposed to an atmosphere containing water vapor. By imposing a high humidity condition in the gas volume using a mixture of gases and water vapor around the non-glass-contact external surface of the rhodium-containing material, the partial pressure of hydrogen is increased after reaching the thermodynamic equilibrium of water, $H_2O \rightarrow H_2 + \frac{1}{2}O_2$, which in turn suppresses the dissolution of rhodium from the alloy into the glass melt.

In some embodiments, the atmosphere is a reducing atmosphere comprising water, oxygen, and nitrogen. The dew point of the atmosphere in in a range from about −40° C. to about 90° C. In some embodiments the melt is at temperature in a range from about 1600° C. to about 1700°

C. and, in certain embodiments, in a range from about 1600° C. to about 1650° C. The melt, in certain embodiments, is a melt of a glass ceramic precursor glass such as a lithium alumina silica glass or the like.

To facilitate maintenance and control of the high humidity condition, at least a portion the continuous unit melter may be encased in a capsule. The method of controlling the partial pressure of hydrogen on the non-glass contact surface of metal-containing systems is described in U.S. Pat. No. 5,785,726 by William Gurney Dorfield et al., entitled "Method of Forming Glasses," filed on Oct. 28, 1996, and issued on Jul. 28, 1998. Capsules for enclosing the precious metal systems in high humidity atmospheres are described in U.S. Pat. No. 7,628,038 by Gilbert DeAngelis et al., entitled "System and Method for Controlling the Environment Around One or More Vessels in a Glass Manufacturing System," filed on Jan. 30, 2009, and issued on Dec. 8, 2209. The contents of U.S. Pat. Nos. 5,785,726 and 7,628,038 are incorporated herein by reference in their entirety.

The method described herein is effective and desirable in the reduction of rhodium dissolution on the order of parts per million from the precious metal without changes in the batch materials, the chemical and physical properties of the product or the normal operating condition of the manufacturing process. The method can be used to minimize the precious metal dissolution for a wide range of glass compositions.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A method, comprising:
   a. providing a melt of a precursor glass, wherein the melt is in contact with a rhodium-containing material;
   b. exposing an external surface that is not in contact with the melt of the rhodium-containing material to an atmosphere containing water vapor, wherein the water vapor suppresses dissolution of rhodium in the melt, and
   c. forming a lithia-alumina-silica glass ceramic from the melt, the glass ceramic having an opacity of at least 85% over a wavelength range of 400 to 700 nm and having CIELAB color space coordinates L*, a*, and b*, wherein L* is at least 92, b* is at least −0.3, and wherein the glass ceramic comprises from 1 ppm to about 10 ppm rhodium.

2. The method of claim 1, wherein the atmosphere has a dew point in a range from about −40° C. to about 90° C.

3. The method of claim 2, wherein the dew point is about 90° C.

4. The method of claim 1, wherein the melt is at a temperature in a range from about 1600° C. to about 1700° C.

5. The method of claim 1, where the melt comprises from 1 ppm to about 6 ppm rhodium.

6. The method of claim 1, further comprising ion exchanging the lithia-alumina-silica glass ceramic.

7. The method of claim 6, wherein the ion exchanged lithia-alumina-silica glass ceramic has a layer extending from a surface of the lithia-alumina-silica glass ceramic to a depth of layer, wherein the layer has a compressive stress of at least 300 MPa, and wherein the depth of layer is at least about 30 microns.

8. The method of claim 1, wherein the lithia-alumina-silica glass ceramic comprises from 1 ppm to about 6 ppm rhodium.

9. The method of claim 1, wherein the atmosphere comprises water vapor, oxygen, and nitrogen.

10. The method of claim 1, wherein the rhodium-containing material is a platinum-rhodium alloy.

11. The method of claim 10, wherein the platinum-rhodium alloy comprises about 80% platinum and about 20% rhodium.

12. The method of claim 1 wherein the rhodium-containing material is in the form of a vessel containing the melt.

13. The method of claim 1, wherein the melt is at a temperature in a range from about 1600° C. to about 1650° C.

14. The method of claim 1, wherein the glass ceramic comprises: from about 62 to about 75 mol % $SiO_2$; from about 10.5 to about 17 mol % $Al_2O_3$; from about 5 to about 13 mol % $Li_2O$; from 0 to about 4 mol % ZnO; from about 0 to about 8 mol % MgO; from about 2 to about 5 mol % $TiO_2$; from 0 to about 4 mol % $B_2O_3$; from 0 to about 5 mol % $Na_2O$; from 0 to about 4 mol % $K_2O$; from 0 to about 2 mol % $ZrO_2$; from 0 to about 7 mol % $P_2O_5$; from 0 to about 0.3 mol % $Fe_2O_3$; from 0 to about 2 mol % MnOx, and from about 0.05 to about 0.2 mol % $SnO_2$, at least one β-spodumene solid solution comprising at least about 70 wt % of the crystalline phases of the glass-ceramic, at least one titanium-containing crystalline phase having an acicular morphology and a rutile phase.

15. The method of claim 1, wherein L* is in a range from about 92.3 to about 94, and a* is in a range from about −0.10 to about −0.50.

16. The method of claim 1, wherein the glass ceramic is transparent to radio waves ranging in frequency from about 3 kHz to about 300 GHz.

17. The method of claim 1, wherein the glass ceramic is ion exchangeable.

* * * * *